United States Patent
Möhrmann

(10) Patent No.: US 6,205,144 B1
(45) Date of Patent: Mar. 20, 2001

(54) PROGRAM UNIT, PARTICULARLY FOR DIGITAL, DATA-COMPRESSED VIDEO DISTRIBUTION SIGNALS

(75) Inventor: Karl Heinz Möhrmann, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 08/981,748
(22) PCT Filed: Jul. 12, 1996
(86) PCT No.: PCT/DE96/01276
 § 371 Date: Dec. 31, 1997
 § 102(e) Date: Dec. 31, 1997
(87) PCT Pub. No.: WO97/04583
 PCT Pub. Date: Feb. 6, 1997

(30) Foreign Application Priority Data

Jul. 18, 1995 (DE) .............................................. 195 26 172

(51) Int. Cl.⁷ .................................................. H04L 12/28
(52) U.S. Cl. ............................................ 370/395; 370/503
(58) Field of Search .................................... 370/395, 503, 370/521, 529, 465, 486, 487, 428; 348/7, 12; 359/158, 137

Primary Examiner—Chau Nguyen
Assistant Examiner—Alexander Boakye
(74) Attorney, Agent, or Firm—Schiff Hardin & Waite

(57) ABSTRACT

For the transmission of ATM digital signals of a program unit, particularly of digital, data-compressed video distribution signals, from a remote digital signal source, particularly a video server, via a head station of a light waveguide and/or coaxial line tree network respectively shared by a plurality of subscriber-side network termination units to at least one of the subscriber-side network termination units, whereby an intermediate storing of such ATM digital signals transmitted with elevated data rate occurs in the head station, the program unit is transmitted from the digital signal source to the intermediate memory of the head station with a data rate that is slightly elevated compared to the data rate nominally required for the program unit and that is retained for the entire duration of the transmission, the data stream being further-transmitted therefrom to the respective subscriber with the signal clock nominally required for the program unit that is offered by a reference clock source; the reference clock(s) is (are) thereby separately transmitted at any rate from the head station to all network termination units connected to the light waveguide and/or coaxial line tree network, whereat the digital signal acquired from the received ATM cells is thus time-regenerated.

7 Claims, 2 Drawing Sheets

Figure 1:
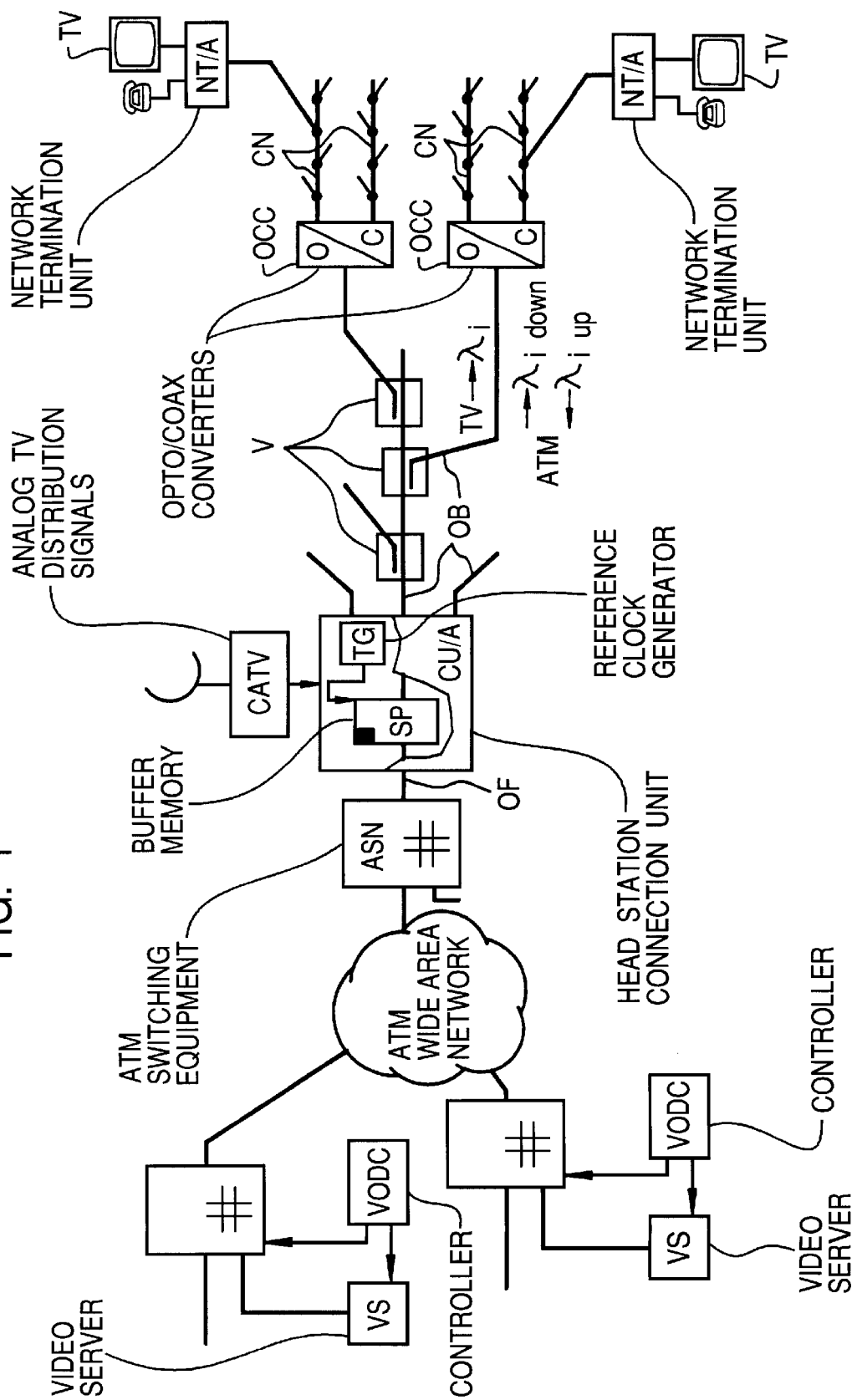

PROGRAM UNIT, PARTICULARLY FOR DIGITAL, DATA-COMPRESSED VIDEO DISTRIBUTION SIGNALS

BACKGROUND OF THE INVENTION

In fiber/coaxial subscriber line networks, the availability of a stable clock signal at the reception side is indispensable for the faultless functioning of the reception-side decoder, particularly given digital, data-compressed video signals transmitted in the form of ATM signals: In an ATM system, the signal transmission fundamentally proceeds asynchronously, i.e. the individual ATM cells in fact arrive in the receiver in the correct sequence, but at irregular time intervals. Although the recovery of an adequately stable reception clock is thereby fundamentally possible, for instance by employing a large buffer memory for smoothing the data stream (with the consequence of undesired signal delay), by the co-transmission of time marks that are regularly mixed in and the like, such techniques are complicated and expensive. For the acceptance of a system, meanwhile, a cost-optimized solution specifically at the subscriber equipment is of great significance.

For the reception-side clock supply for digital signals, particularly digital, data-compressed TV distribution signals transmitted in the form of ATM signals to the subscriber-side network termination units from a digital signal source, particularly a TV signal source, via a connection unit and a light waveguide and/or coaxial line tree network connected thereto and shared by a respective plurality of subscriber-side network termination units, one can proceed such that the signal clock(s) required is (are), at any rate, separately transmitted from the connection unit as a head location to all network termination units connected to the light waveguide and/or coaxial conductor tree network. Thus, the digital signal acquired from the received ATM cells is time-regenerated (EP Application 94104201.2).

This method yields the advantage that the signal clocks can also be transmitted from the (video) signal source to the head station (associated unit) in a way (for example, with mixed-in time marks in the form of specific ATM cells) that can be connected with a higher expense for the transmission or, respectively, recovery of a stable clock signal, This can occur in common for all subscribers connected to the corresponding connection unit. By contrast, the expense exerted in subscriber outlay to be exerted subscriber individual fashion for the clock recovery can be kept relatively low.

The higher expense is thereby more likely to be bearable when signal clocks of only one or a few (video) signal sources situated, if possible, in the proximity of the head station (connection unit) are to be transmitted and recovered. When, by contrast, many (video) signal sources are to be simultaneously incorporated and/or greater distances and, potentially, telecom administration boundaries lie between (video) signal sources and head station (connection unit), then the procedure could encounter economic or technical limits as well. Digital, data-compressed video signals, however, should also be capable of being delivered via the public network from remote video servers or sources, even potentially crossing boundaries, without these having to be synchronized with one another in terms of frequency or, with a locally existing clock.

In this context, it is already known (from A. D. Gelman, S. Halfin, W. Willinger, "On Buffer Requirements For Store-And-Forward Video on Demand", Proc. GLOBECOM '91, pp. 976–980) to provide a burst-like transmission with high transmission rate (up to 150 Mbit/s) for the transmission with ATM from a remote video databank to a buffer memory in the local head station via the long-distance network, to intermediately store the information in the head station and then to slowly transmit the information to the subscriber in real time. This requires a correspondingly high memory capacity in the head station.

A version of this procedure (recited by D. Deloddere, W. Verbiest, H. Verhille, "Interaktive [sic] Video On Demand" in IEEE Communications Magazine, May 1994, pages 82–88) provides a fast, high-rate transmission and storing of only the first minutes of the film, whereas the rest is slowly transmitted and written into the buffer memory. The above-addressed problem of a low-outlay or, respectively, cost-beneficial reception clock supply even given a plurality of (video) signal sources or, respectively, given greater distances and, potentially, telecom administration boundaries lying between (video) signal sources and head station (connection unit) remains unresolved in both instances.

By comparison thereto, the invention discloses a way for an advantageous reception-side clock supply of subscriber-side network termination units of a light waveguide and/or coaxial line tree network for fiber/coaxial subscriber line networks, said network termination units calling digitally data-compressed video signals transmitted with ATM.

The invention is directed to a method for the transmission of ATM digital signal of a program unit, particularly of digital, data-compressed video distribution signals, from a remote digital signal source, particularly a video server, via a head station of a light waveguide and/or coaxial line tree network respectively shared by a plurality of subscriber-side network termination units to at least one of the subscriber-side network termination units, whereby an intermediate storage of such ATM digital signals transmitted with elevated data rate occurs in the head station; this method is inventively characterized in that the program unit is transmitted from the digital signal source to the intermediate memory of the head station with a data rate that is slightly elevated compared to the data rate nominally required for the program unit and that is retained for the entire duration of the transmission, the data stream being further-transmitted therefrom to the respective subscriber with the signal clock nominally required for the program unit that is offered by a reference clock source; the reference clock(s) is (are) thereby separately transmitted at any rate from the head station to all network termination units connected to the light waveguide and/or coaxial line tree network, whereat the digital signal acquired from the received ATM cells is thus time-regenerated.

By offering corresponding reference clock sources in the head station of a light waveguide and/or coaxial line tree network shared by a plurality of subscriber-side network termination units, the invention, which proceeds therefrom that only a limited plurality of different nominal data rates will be provided in the network, yields the advantage that, given a transmission of digital, data-compressed video signals in ATM format from remote digital signal sources (video servers) via the (potentially public) transmission network to the head station of the light waveguide and/or coaxial line tree network and, further, to the light waveguide and/or coaxial line tree network shared by the subscriber-side network termination units to the subscriber-side network termination units thereof, no signal clocks need be transmitted between digital signal source and head station and no synchronization is required between digital signal source and light waveguide and/or coaxial line tree network. Slight deviations of the video (film) speed compared to the speed in the original recording or, respectively, storing and encoding are imperceptible.

Further characteristics of the invention can be seen from the following explanation von [sic] the basis of the drawings. Thereby shown are FIG. 1 a subscriber line network, FIG. 2 a head station, and FIG. 3 a network termination means.

In the drawing, FIG. 1 schematically shows an example of a subscriber line network. Coaxial conductor networks CN in the standard tree structure are thereby shown in the right-hand part of the drawing in the way in which they will usually already be laid.

At the subscriber side, the coaxial conductors are respectively terminated with a network termination means NT/A that is respectively capable of converting its reception and transmission signals such that the connection of standard terminal equipment is possible; a network termination means NT/A comprises, for example, terminals for distributed television or, respectively, video on demand, for traditional telephony (POTS) and/or narrowband ISDN or for an arbitrary broadband ISDN service as well.

At the side facing away from the subscriber, the coaxial conductor networks CN are respectively connected via an opto/coax converter means (optical/coax converter) OCC to an optical subscriber line of a light waveguide network OB branched via optical splitters V that connects the coaxial line networks to a connection unit CU/A preferably formed with an (ATM) multiplexer/demultiplexer. As also indicated in FIG. 1, a plurality of such light waveguide networks OB can be connected to such a connection unit CU/A; as likewise indicated in FIG. 1, a plurality of coaxial conductor sub-networks CN, for example up to four, can be connected to a converter means OCC in a corresponding way. When a coaxial conductor network CN enables the connection of, for example, 100 subscribers, the converter means OCC serves, for example, 400 subscribers and the connection unit CU/A forming, so to speak, a head station serves, for example, 2000 through 4000 subscribers.

The transmission in the subscriber line network can proceed on the basis of ATM cells (cell-based) with a system-specific overhead. The data rate of, for example, 622 Mbit/s in the transmission direction to the subscriber (downstream) can thereby be higher than the data rate in the opposite direction (upstream) of, for example, 155 Mbit/s, whereby the downstream transmission—from a transmission-oriented point of view—can proceed in a plurality of channels (for example, in four channels of 155 Mbit/s each).

In the system outlined in FIG. 1, analog TV distribution signals (CATV) are supplied into the connection unit CU/A shared by the connected subscribers and are transmitted to all connected subscribers. These video signals can be received in the standard way at the subscriber with a television receiver (referenced TV in FIG. 1) connected to the network termination means NT/A thereof.

In the telecommunication system outlined in FIG. 1, let the connection unit CU/A forming the head station of the interactive subscriber line network therefor be supplied with digital signals in the ATM format in addition to the analog TV signals. Such signals can, for example, be digital video signals of a video on demand service (also including an ATM return channel for the program selection by the TV subscriber) or can also be broadband interactive data signals, whereby the digital video signals are likewise received by the television receiver TV with an appropriate auxiliary device (set top box) that is not separately shown in FIG. 1.

In the system outlined in FIG. 1, further, narrowband ATM voice and, potentially, data signals as well can be transmitted in both directions, this being indicated in FIG. 1 by a telephone connected to the network termination means NT/A. Further services that can require the connection of further terminal equipment to the respective network termination means NT/A are possible, without this having to be also shown in FIG. 1.

The ATM signals are conducted via an Atm switching equipment ASN. For video on demand, video servers VS are thereby required in which the video programs (films) to be called are stored, namely usually in digital and data-compressed form, for example according to the MPEG2 algorithm with, for example, 4 Mbit/s prepared in ISO-MPEG. It is indicated in FIG. 1 thereto that the video servers VS are not directly connected to the ATM switching equipment ASN but, situated remote from the ATM switching equipment ASN, are assumed to be connectable thereto via further ATM switching equipment and intervening transmission paths of an ATM wide-area network. Let the video servers VS be respectively controlled by a controller VODC that evaluates signalling information coming via the respective return channel from subscribers making use of the video on demand service and correspondingly controls the program output from the video server VS.

Since the video servers VS connected to the wide-area network at different locations are not synchronized with one another, the video signals of these servers exhibit slightly different speeds or, respectively, clock frequencies, this, of course, initially precluding the employment of a uniform clock frequency in the video decoders or, respectively, network termination means NT/A for all received films. On the other hand, the asynchronous transmission by the ATM network leads thereto that the individual ATM cells arrive at irregular time intervals, this leading to a considerable jitter after the "unpacking" of the cells that the following video decoder can usually not process. An individual reception-side recovery and regeneration of the clock of the respectively received digital video signal for each video signal, for example with phase-locked loop circuits and smoothing memories, therefore becomes correspondingly complicated, whereby the required outlay is multiplied when a network termination means simultaneously serves a plurality of terminal equipment.

According to the invention, however, every video server VS transmits with a data rate $f_{film}=f_{nom}+\Delta f$ that is slightly elevated compared to the data rate $f_{nom}$ required per se for the respective program unit, potentially i.e. the film, whereby the data rate can be different for each video server. For example, a transmission rate in the network that is raised by about a factor $10^{-5}$ compared to the nominal value suffices. The data stream transmitted from the digital signal source VS to the head station CU/A enters into a buffer memory SP here with this data rate that is slightly elevated compared to the data rate nominally required for the program unit and that is retained for the entire duration of the transmission, this buffer memory SP being dimensioned such that, without overflowing, it can store "excess" bits arriving during the duration of the forwarding of the program unit from the local head station CU/A to the subscriber-side network termination means NT/A, i.e. during the running time of an entertainment film of, typically, 1.5 hours from the point of view of the subscriber. Given a film with a duration of 2 hours that is encoded with 10 Mbit/s, only $10 \cdot 10^6 \cdot 10^{-5} \cdot 3600 \cdot 2 = 720$ kbit excess data arrive during these two hours.

The readout of the data stream to the respective subscriber proceeds with a reference clock of, for example, $10^{-7}$ locally generated in a reference clock source TG with high precision. The reference clock frequency is thereby $f_{ref}=k \cdot f_{nom}$, wherein k is a rational factor that operates the clock frequency of the digital, data-compressed video sequence (for example, 4 MHz) with the transmission frequency for this signal in the ATM format. This is higher than the net clock rate since, of course, additional address information must be co-transmitted in the cell headers. At the same time, the reference clock frequency $k \cdot f_{nom}$ is separately transmitted to the network termination units NT/A in the entire subscriber line network, where it is used for the de-jittering of the received ATM signal before or, respectively, during "unpacking".

The memory SP is employed in common for all video signals received in the head station CU/A. It can be all the smaller the less of a difference there is between write and read speed for the respective video signals.

A stable and jitter-free de-clocking [sic] at the subscriber side is thus enabled for digital video signals from arbitrary sources that are not synchronized. A negotiation of the frequency $f_{nom}$ to be employed is merely required, whereby a plurality of different frequencies $f_{nom}$ can also be declared; this, however, requires the transmission of a plurality of reference frequencies $k \cdot f_{nom}$ in the subscriber line network.

Figure 2:
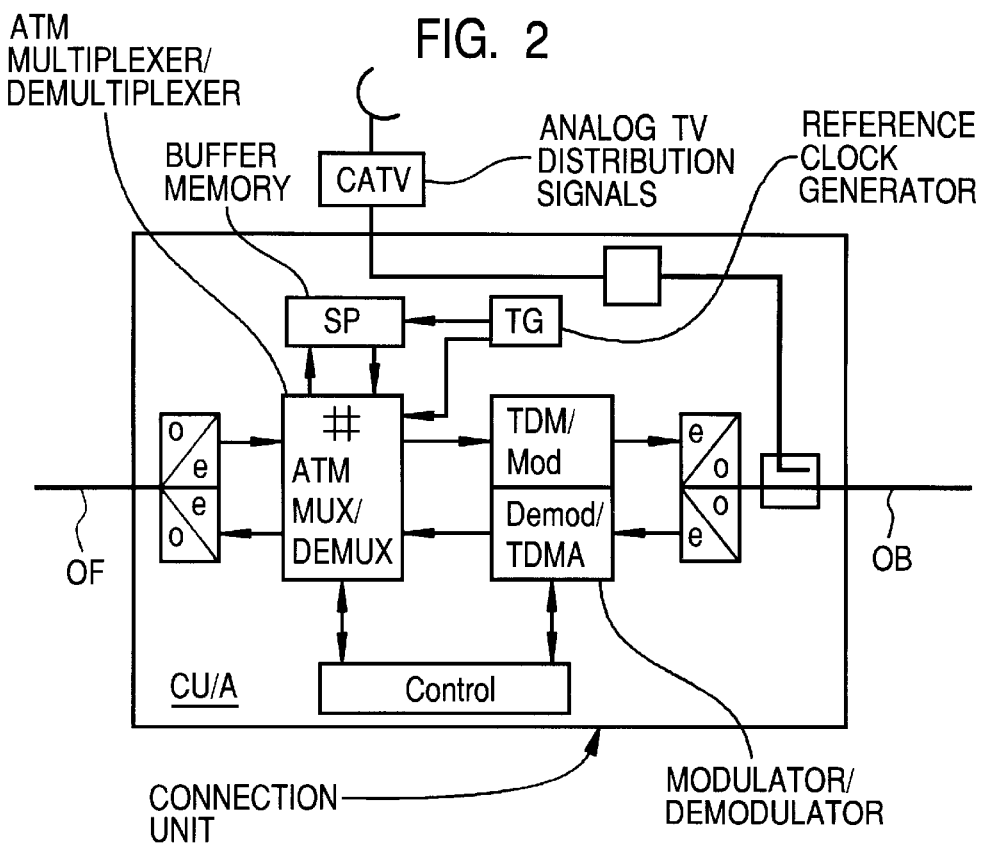
Figure 3:
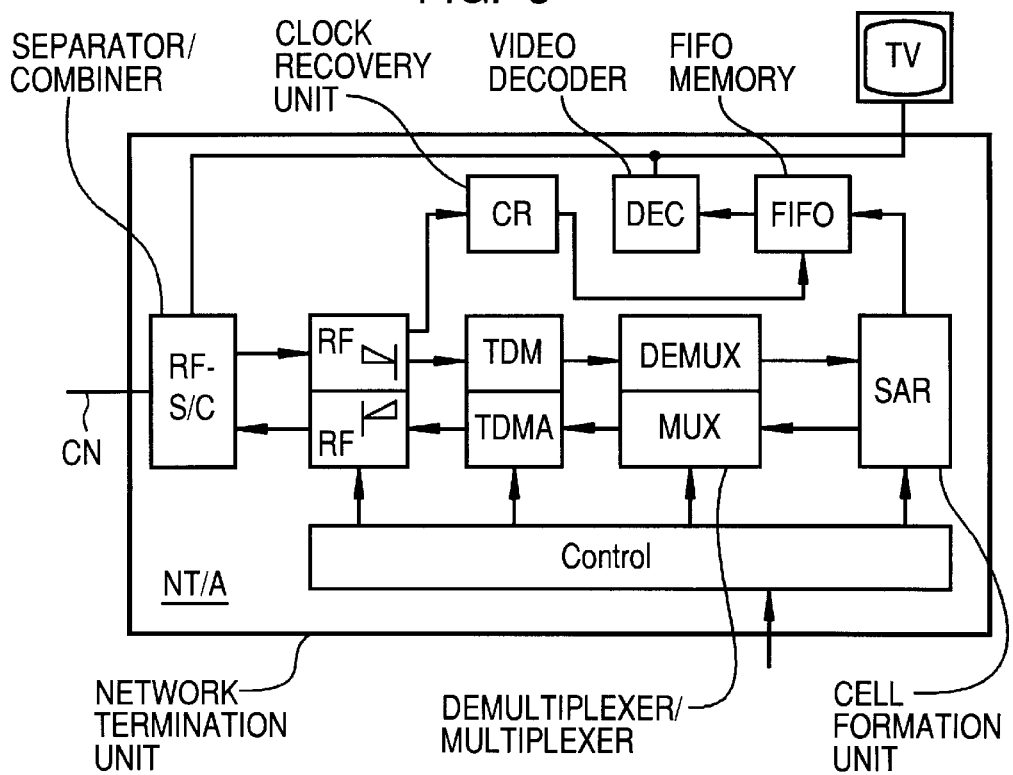

The invention is explained in greater detail on the basis of FIG. 2 and FIG. 3.

Further circuit-oriented details of a connection unit CU/A forming a head station can be seen from FIG. 2; let this connection unit CU/A be connected to an ATM switching equipment (ASN in FIG. 1) via a light waveguide (optical feeder) OF at the side facing away from the subscriber and, at the side facing toward the subscriber, to subscriber-individual network termination devices (NT/A in FIG. 1) via a light waveguide tree network OB (also see FIG. 1) and coaxial tree networks (CN in FIG. 1) following thereupon. The light waveguide OF is terminated in the head station (connection unit) CU/A with an optoelectric receiver o/e and electrooptical transmitter o\e; the light waveguide tree network OB is terminated in the connection unit CU/A with an optoelectric receiver e\o and electrooptical transmitter e/o. An ATM multiplexer/demultiplexer (ATM MUX/DEMUX) follows the electrooptical transmitter o\e and optoelectric receiver o/e at the side facing away from the subscriber. This extracts the ATM cells destined for the connection unit CU/A from the downstream data stream incoming on the light waveguide (optical feeder) OF and allocates them to the respective coaxial conductor tree network CN to which the receiving subscriber is connected.

In the direction to the subscribers, the ATM signals first traverse the buffer memory SP already explained in conjunction with FIG. 1, from which they are read out via the ATM multiplexer/demultiplexer ATM MUX/DEMUX with the reference clock $k \cdot f_{nom}$ supplied from a high-stability, local clock generator TG in order to be forwarded in multiplex to a unit TDM/Mod. According to principles that are known and therefore not in need of further explanation, the acceptance of ATM cells intended for the connection unit CU/A from the TDM cell stream transmitted downstream via the light waveguide OF and the output of ATM cells to be transmitted downstream via the light waveguide OF are effected in this unit TDM/MOD, and, following RF (radiofrequency) modulation, the ATM signals accepted proceeding in downstream direction from the light waveguide OF—also including digital TV signals—are forwarded to the light waveguide tree network OB.

In addition thereto, the reference clock $k \cdot f_{nom}$ is transmitted to all network termination devices NT/A or, respectively, video decoders, to which end the output side of the reference clock generator TG in the exemplary embodiment of FIG. 2 leads not only to the buffer memory SP and to the Atm multiplexer/demultiplexer ATM MUX/DEMUX but also to the RF modulator of the head station (connection unit) CU/A, so that the reference clock signal proceeds separately—in the form of a pilot signal—from the head station (connection unit) CU/A via the light waveguide and/or coaxial line tree network OB-CN (in FIG. 1) to all network termination units NT/A (in FIG. 1) connected thereto.

Following RF (radiofrequency) demodulation and a TDMA procedure in a unit Demod/TDM, ATM cells incoming from the subscribers via the light waveguide OB [sic] and to be transmitted via the light waveguide OF proceed to the ATM multiplexer/demultiplexer ATM MUX/DEMUX that combines the ATM cells incoming from the subscribers and forwards them via the light waveguide OF to the ATM switching equipment ASN (in FIG. 1) and, potentially, further into the ATM wide-area network.

As already indicated in FIG. 1, further sub-networks can be connected to the head station (connection unit) CU/A via further fibers OB, without this having to be additionally shown in detail in FIG. 2.

In a region that is not spectrally employed in some other way, the pilot signal can be transmitted via the optical fibers OB or, respectively, the coaxial tree network CN to the subscriber-side termination devices NT/A, for example below 10 MHz; the appertaining reference clock frequency can be directly derived from the pilot frequency. To that end, the selected pilot reference is expediently operated in a simple way with the required reference clock frequency, preferably in the form of whole-numbered parts or multiples of this reference clock frequency. The restoration of the reference clock frequency in the subscriber-side network termination device NT/A is then possible in a simple way by filtering.

Alternatively thereto, it is also possible to define a pilot frequency that is not numerically linked with the required reference clock frequency and to then modulate this with the reference clock frequency; this is connected with an increased flexibility in the spectral allocation. The reference clock frequency can thereby also be recovered in the subscriber-side network termination device NT/A in a simple way by demodulation and filtering.

Finally, the (video) digital signal acquired from the received ATM cells is time-regenerated in the respective network termination unit NT/A with the signal clock transmitted separately from the connection unit CU/A (in FIG. 1 and FIG. 2) via the light waveguide or, respectively, coaxial line tree network OB-CB (in FIG. 1) to all network termination units NT/A connected thereto, as likewise indicated in FIG. 3. Circuit-oriented details of a network termination means NT/A—which is assumed to terminate a coaxial line CN of the coaxial conductor tree network (CN in FIG. 1)—that are relevant for the understanding of the invention can be schematically derived from FIG. 3. A RF (radiofrequency) separator/combiner RF-S/C to which a RF (radiofrequency) modulator/demodulator is connected thereby forms the termination at the coaxial line side. A means TDM/TDMA (which may be assumed to effect the acceptance of ATM cells intended for the network termination means NT/A from the TDM cell stream transmitted downstream and the output of ATM cells to be transmitted upstream in a TDMA method according to principles that are known per se and therefore require no further explanation here) and a (de-) multiplexer MUX/DEMUX as well as a means SAR for cell formation (segmentation) and cell resolution (reassembling) follow thereupon, but this shall not be pursued in greater detail here since this is not required for an understanding of the invention.

According to FIG. 3, a means CR for clock recovery is then connected to the RF demodulator, this, in the way mentioned above, being assumed to restore the signal clock (s) required for the reception of (TV) digital signals, the (video) digital signal acquired from the received ATM cells then being time-regenerated with this (these) signal clock(s). As also indicated in FIG. 3, this can occur with the assistance of a FIFO (First In First Out) memory into which the (video) digital signal acquired from the received ATM cells and thus still clock-jittered at first is read proceeding from the segmentation/reassembling means SAR in the jittered clock and from which this (video) digital signal is in turn read out with the time-regenerated clock output by the clock recovery means CR. The time-clock-regenerated video digital signal then proceeds to a video decoder Dec to which, finally, the video receiver TV of the appertaining subscriber is connected. Analog CATV distribution signals are supplied directly to the video receiver TV proceeding from the RF separator/combiner RF-S/C.

Slight deviations of the film speed compared to the speed in the original recording or, respectively, storing and encoding are imperceptible as a result of the extremely slight frequency deviation.

In conclusion, let it be pointed out that the invention explained above with reference to the example of a subscriber line network with coaxial conductor networks CN outlined in FIG. 1 is not bound to such coaxial conductors but can also be applied in conjunction with other transmission media such as light waveguides, wireless transmission links or symmetrical copper lines, without this requiring even further explanations here.

What is claimed is:

1. A method for transmission of ATM digital signals of a program unit comprising digital data-compressed video distribution signals from a remote digital signal source comprising a video server via a head station of a light waveguide or coaxial line tree network to at least one of a plurality of subscriber-side network termination units being fed by the network, comprising the steps of:

temporarily intermediately storing ATM digital signals in a buffer memory of the head station, the program unit being transmitted in a data stream from the digital signal source to the buffer memory of the head station with a data rate which is elevated compared to a data rate nominally required for the program unit and which is retained for an entire duration of the transmission;

further transmitting the program unit in a data stream from the buffer memory to the respective subscriber termination unit with a reference clock provided by a reference clock source and at said nominally required data rate employed for the program unit; and separately transmitting the reference clock from the head station to the respective network termination unit connected to the light waveguide or coaxial line tree network so that the digital signals acquired from received ATM cells is time-regenerated.

2. The method according to claim 1 including the step of transmitting the reference clock in the form of pilot signals from the head station via the light waveguide or coaxial line tree network to all network termination units connected thereto.

3. The method according to claim 2 including the step of directly deriving a frequency of the reference clock from a pilot frequency transmitted to the subscriber-side termination units via the light waveguide or the coaxial tree network in a region that is not spectrally used in some other way.

4. The method according to claim 3 including the step of operating the pilot frequencies with the required reference clock frequencies in the form of whole-numbered parts or multiples.

5. The method according to claim 2 including the step of determining pilot frequencies which are not numerically linked with reference clock frequencies and modulating carriers of the pilot frequencies which are not numerically linked with the reference clock frequencies.

6. The method according to claim 1 wherein the network connecting to the head station comprises a light waveguide network or coaxial line tree network.

7. A method for transmission of ATM digital signals of a program unit comprising digital data-compressed video distribution signals from a remote digital signal source via a head station of a tree network to at least one of a plurality of subscriber-side network termination units being fed by the network, comprising the steps of:

temporarily intermediately storing ATM digital signals in a buffer memory of the head station, the program unit being transmitted in a data stream from the digital signal source to the buffer memory of the head station with a data rate which is elevated compared to a data rate nominally required for the program unit;

further transmitting the program unit in a data stream from the buffer memory to the respective subscriber termination unit with a reference clock provided by a reference clock source and at said nominally required data rate employed for the program unit; and transmitting the reference clock from the head station to the respective network termination unit connected to the tree network so that the digital signals acquired from received ATM cells is time-regenerated.

* * * * *